April 15, 1930.  E. ROSSI  1,754,804
THEFTPROOF LICENSE PLATE BRACKET
Filed Feb. 6, 1929
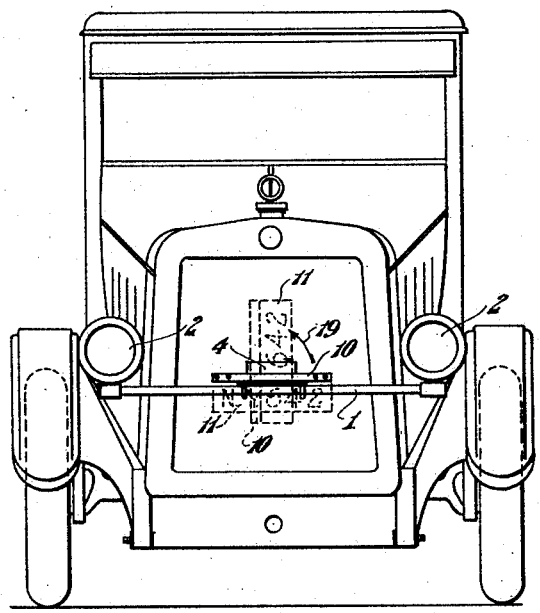
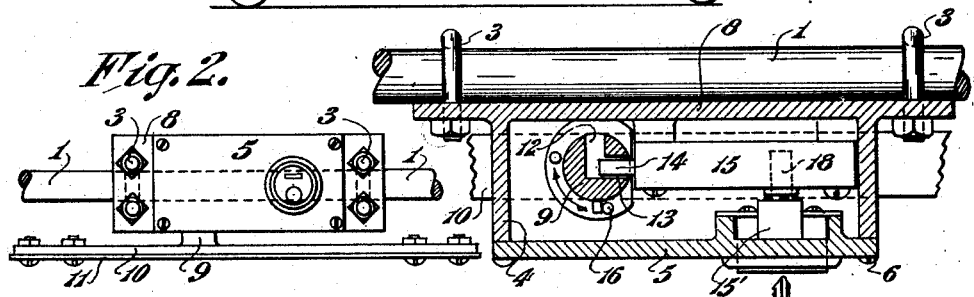
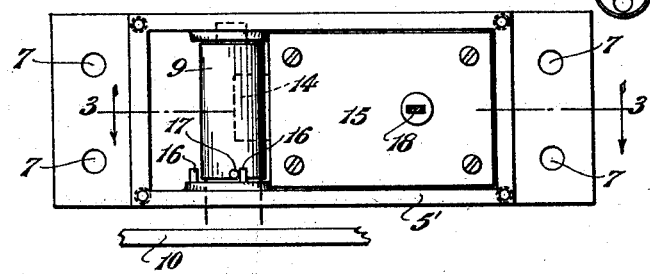
INVENTOR.
Egidio Rossi,
BY Harry W. Bourn.
ATTORNEY.

Patented Apr. 15, 1930

1,754,804

UNITED STATES PATENT OFFICE

EGIDIO ROSSI, OF ALBANY, NEW YORK

THEFTPROOF LICENSE-PLATE BRACKET

Application filed February 6, 1929. Serial No. 338,016.

The present invention relates to an improvement in theft proof license plate bracket.

An object of the invention is to readily enable any person to detect that a machine is being operated by an unauthorized person.

Broadly, the invention comprises a casing which is designed to be readily attached to the cross bar or rod which connects the headlights of a motor vehicle. This casing is provided with a suitable locking mechanism for retaining the license, number or registration plate in a locked position and either in a horizontal or arbitrarily vertical position for parking purposes. The horizontal position is the usual way that the license plate is displayed, while the vertical position is an arbitrary and unusual position, thereby enabling a traffic officer or other person to determine that the motor vehicle is being operated by an unauthorized person. The locking mechanism is so constructed that when the key is inserted and turned right handed, the bar to which the license plate is secured is released and may be turned into a vertical position, and, when in this position, the key is turned left handed and locks the plate in this vertical or parking position. The key is then removed and the license plate left in this position, until the authorized person wishes to operate the motor vehicle.

Referring to the drawings:

Fig. 1 is a front elevational view of a motor vehicle showing, in dotted lines, the license plate in a horizontal and also in a vertical position.

Fig. 2 is a top plan view of the locking mechanism secured to the cross rod, which is attached to the headlights.

Fig. 3 is a vertical sectional view on the line 3—3 of Fig. 4 illustrating the interior locking mechanism.

Fig. 4 is a top plan view with the cover plate removed.

Referring to the drawings in detail:

1 designates the usual cross bar or rod which connects and supports the headlights, indicated at 2. Attached to the rod 1 by means of the U-shaped bolts 3, is the lock enclosing casing 4 having the cover member 5 secured thereto with the screws 6. The bolts 3 are located in the openings 7 of the base of the casing which constitute the bottom 8 of the casing 4. Rotatably mounted in the opposite sides of the casing is the shaft 9, which extends through the side member 5'. A bar 10 is attached to the shaft 9 which is formed with openings for securing the license or number plate 11. The shaft 9 is formed with openings 12 and 13 that are at right angles or 90° to each other, as shown. These openings are designed to receive the locking bolt 14 of the lock, indicated at 15. 16 are pins secured to the side 5' for limiting the extent of rotation of the shaft 9, and 17 is a pin on the shaft 9 which engages the pin 16 for limiting the extent of rotation of the bar 10 and the attached number plate 11. 18 is a key for operating the lock 15. 15' is the barrel of the lock. When the key is inserted and turned right handed, the bolt 14 is withdrawn, thus permitting the number plate 11 and bar 10 to be rotated in the direction of the arrow 19, (see Fig. 1). When in this position, the key is turned left handed permitting the bolt 14 to enter the opening 12, thus locking the number plate in the vertical position. The key is now withdrawn and retains the number plate in its vertical position. A motor vehicle being operated with the number plate located in the vertical position, indicates that it is being used by an unauthorized person and would therefore lead to its recovery.

When an authorized, or proper person, wishes to operate the car, the key is inserted and turned right handed, thus permitting the bolt 15 to be withdrawn and the number plate rotated or re-located in a horizontal position. It is then locked in this position and the key removed.

What I claim is:

1. In a device for the purpose described, a casing member, means for securing the casing to a fixed part of a motor vehicle, a locking mechanism within the casing, a shaft rotatably mounted within the casing and extending to the outer side of the casing, a bar attached to the shaft, means for securing a registration plate to the bar, means for limiting the extent of rotation of the shaft, and co-operating means between the shaft and the lock for retaining the registration plate in either a horizontal or in a vertical position.

2. In combination with a fixed part of a motor vehicle, a casing, means comprising hooks for attaching the casing to the fixed part, a locking mechanism within the casing, a shaft rotatably mounted in the casing and formed with two recesses at right angles to each other for receiving the locking bar of the lock, the casing having pins secured thereto and arranged at 90° to each other, a pin on the shaft contacting with the fixed pins for limiting the extent of rotation of the shaft and for aligning the recesses in the shaft with the bolt of the lock, means for attaching a registration plate to the shaft, the construction and arrangement being such that the registration plate may be locked in a horizontal or in a vertical position, as described.

EGIDIO ROSSI.